(12) United States Patent
Blair et al.

(10) Patent No.: US 11,496,418 B1
(45) Date of Patent: Nov. 8, 2022

(54) PACKET-BASED AND TIME-MULTIPLEXED NETWORK-ON-CHIP

(71) Applicant: Xilinx, Inc., San Jose, CA (US)

(72) Inventors: Zachary Blair, San Jose, CA (US);
Pongstorn Maidee, San Jose, CA (US);
Alireza S. Kaviani, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 137 days.

(21) Appl. No.: 17/002,648

(22) Filed: Aug. 25, 2020

(51) Int. Cl.
*H04L 49/109* (2022.01)
*H04L 49/15* (2022.01)
*H04J 3/06* (2006.01)

(52) U.S. Cl.
CPC .......... *H04L 49/109* (2013.01); *H04J 3/0658* (2013.01); *H04L 49/15* (2013.01)

(58) Field of Classification Search
CPC ....... H04L 49/109; H04L 49/15; H04J 3/0658
See application file for complete search history.

(56) References Cited

U.S. PATENT DOCUMENTS

| | | |
|---|---|---|
| 3,776,137 A | 12/1973 | Abbott |
| 4,876,641 A | 10/1989 | Cowley |
| 5,848,264 A | 12/1998 | Baird et al. |
| 6,090,156 A | 7/2000 | MacLeod |
| 6,091,263 A | 7/2000 | New et al. |
| 6,150,839 A | 11/2000 | New et al. |
| 6,204,687 B1 | 3/2001 | Schultz et al. |
| 6,462,579 B1 | 10/2002 | Camilleri et al. |
| 6,480,923 B1 * | 11/2002 | Moertl ................ G06F 13/4036 710/305 |
| 6,526,557 B1 | 2/2003 | Young et al. |
| 6,759,869 B1 | 7/2004 | Young et al. |
| 6,810,514 B1 | 10/2004 | Alfke et al. |
| 6,836,842 B1 | 12/2004 | Guccione et al. |
| 6,907,595 B2 | 6/2005 | Curd et al. |

(Continued)

OTHER PUBLICATIONS

Chris Fallin, et al., Chipper: A Low-complexity Bufferless Deflection Router, Proceedings of the IEEE International Symposium on High Performance Computer Architecture (HPCA), 2011, 144-155.

(Continued)

*Primary Examiner* — Chi H Pham
*Assistant Examiner* — Vladislav Y Agureyev
(74) *Attorney, Agent, or Firm* — Kevin T. Cuenot

(57) ABSTRACT

An integrated circuit can include a Network-on-Chip (NoC) having a router network with first and second shared physical channels. The NoC includes one or more master bridge circuits (MBCs) coupled to the router network, where each MBC provides a packet-based interface to a master client circuit coupled thereto for initiating transactions over the router network. Each MBC sends and receives data for the transactions over the router network as flits of packets according to a schedule. The NoC includes one or more slave bridge circuits (SBCs) coupled to the router network, where each SBC provides a packet-based interface to a slave client circuit coupled thereto to for responding to the transactions over the router network. Each SBC sends and receives the flits over the router network according to the schedule. The flits sent from different client circuits are interleaved using time-multiplexing on the first and second shared physical channels.

20 Claims, 9 Drawing Sheets

(56) References Cited

U.S. PATENT DOCUMENTS

| | | |
|---|---|---|
| 7,024,651 B1 | 4/2006 | Camilleri et al. |
| 7,057,413 B1 | 6/2006 | Young et al. |
| 7,080,283 B1 | 7/2006 | Songer |
| 7,124,338 B1 | 10/2006 | Mark et al. |
| 7,182,006 B1 | 2/2007 | Wu |
| 7,185,309 B1 | 2/2007 | Kulkarni |
| 7,224,184 B1 | 5/2007 | Levi et al. |
| 7,281,093 B1 | 10/2007 | Kulkarni et al. |
| 7,302,625 B1 | 11/2007 | Payakapan et al. |
| 7,380,035 B1 | 5/2008 | Donlin |
| 7,394,288 B1 | 7/2008 | Agarwal |
| 7,454,658 B1 | 11/2008 | Baxter |
| 7,477,072 B1 | 1/2009 | Kao et al. |
| 7,478,357 B1 | 1/2009 | Mason et al. |
| 7,482,836 B2 | 1/2009 | Levi et al. |
| 7,500,060 B1 | 3/2009 | Anderson et al. |
| 7,509,617 B1 | 3/2009 | Young |
| 7,518,396 B1 | 4/2009 | Kondapalli et al. |
| 7,521,961 B1 | 4/2009 | Anderson |
| 7,546,572 B1 | 6/2009 | Ballagh et al. |
| 7,574,680 B1 | 8/2009 | Kulkarni et al. |
| 7,619,442 B1 | 11/2009 | Mason et al. |
| 7,640,527 B1 | 12/2009 | Dorairaj et al. |
| 7,650,248 B1 | 1/2010 | Baxter |
| 7,724,815 B1 | 5/2010 | Raha et al. |
| 7,746,099 B1 | 6/2010 | Chan et al. |
| 7,788,625 B1 | 8/2010 | Donlin et al. |
| 7,831,801 B1 | 11/2010 | Anderson |
| 8,006,021 B1 | 8/2011 | Li et al. |
| 8,020,163 B2 | 9/2011 | Nollet et al. |
| 8,045,546 B1 | 10/2011 | Bao et al. |
| 8,102,188 B1 | 1/2012 | Chan et al. |
| 8,214,694 B1 | 7/2012 | McKechnie et al. |
| 8,250,342 B1 | 8/2012 | Kostamov et al. |
| 8,359,448 B1 | 1/2013 | Neuendorffer |
| 8,363,629 B1 * | 1/2013 | Gurbuz ............... H04L 12/413 370/445 |
| 8,415,974 B1 | 4/2013 | Lysaght |
| 8,719,750 B1 | 5/2014 | Balzli, Jr. |
| 8,719,808 B1 | 5/2014 | Prinzing |
| 8,796,539 B2 | 8/2014 | Asaumi et al. |
| 8,838,869 B1 * | 9/2014 | Puranik ............... G06F 13/4022 710/312 |
| 8,928,351 B1 | 1/2015 | Konduru |
| 9,038,072 B2 * | 5/2015 | Nollet ................. G06F 15/7867 718/100 |
| 9,081,634 B1 | 7/2015 | Simkins et al. |
| 9,218,443 B1 | 12/2015 | Styles et al. |
| 9,432,298 B1 * | 8/2016 | Smith .................... H04L 47/34 |
| 9,436,785 B1 | 9/2016 | Javre et al. |
| 9,578,099 B2 | 2/2017 | Llorca et al. |
| 9,697,161 B2 * | 7/2017 | Mangano ............. G06F 13/14 |
| 9,722,613 B1 | 8/2017 | Schultz et al. |
| 10,243,882 B1 | 3/2019 | Swarbrick et al. |
| 10,250,958 B2 * | 4/2019 | Chen .................... H04L 49/109 |
| 10,252,011 B2 | 4/2019 | Garde et al. |
| 10,554,584 B2 * | 2/2020 | Ge ....................... G06F 13/4247 |
| 10,707,875 B1 * | 7/2020 | Orthner ............. H03K 19/17756 |
| 2004/0114609 A1 | 6/2004 | Swarbrick et al. |
| 2004/0210695 A1 | 10/2004 | Weber et al. |
| 2007/0006137 A1 | 1/2007 | Savagaonkar et al. |
| 2008/0082759 A1 | 4/2008 | Pong |
| 2008/0320255 A1 | 6/2008 | Wingard |
| 2008/0320268 A1 | 6/2008 | Wingard |
| 2009/0043934 A1 * | 2/2009 | Bjerregaard ........ H04L 47/2433 710/244 |
| 2010/0110884 A1 * | 5/2010 | Kulkarni ............. H04L 12/4625 370/242 |
| 2010/0322237 A1 | 12/2010 | Raja |
| 2011/0225337 A1 * | 9/2011 | Byrne ................. G06F 13/4059 710/306 |
| 2012/0036296 A1 | 2/2012 | Chou |
| 2012/0310983 A1 | 8/2012 | Mittal |
| 2014/0112141 A1 * | 4/2014 | Yun ....................... H04L 47/125 370/235 |
| 2014/0376569 A1 * | 12/2014 | Philip ....................... G06F 1/12 370/503 |
| 2015/0103822 A1 * | 4/2015 | Gianchandani ......... H04L 69/08 370/389 |
| 2015/0188847 A1 * | 7/2015 | Chopra .................. H04L 45/306 370/401 |
| 2015/0312254 A1 * | 10/2015 | Schmitt ............... H04L 63/0823 726/5 |
| 2016/0004656 A1 * | 1/2016 | Arbel .................. G06F 12/1441 710/110 |
| 2016/0021217 A1 * | 1/2016 | Lang ....................... H04L 49/25 709/209 |
| 2016/0149789 A1 * | 5/2016 | Lang ....................... H04L 43/10 370/401 |
| 2016/0344629 A1 * | 11/2016 | Gray ....................... H04L 45/60 |
| 2017/0063609 A1 * | 3/2017 | Philip .................. H04L 12/4641 |
| 2017/0140800 A1 | 5/2017 | Wingard et al. |
| 2017/0195258 A1 | 7/2017 | Wang et al. |
| 2017/0220499 A1 | 8/2017 | Gray |
| 2017/0293512 A1 * | 10/2017 | Yan ....................... G06F 13/28 |
| 2017/0293586 A1 * | 10/2017 | Yan ...................... G06F 13/4221 |
| 2017/0293587 A1 * | 10/2017 | Yan ...................... G06F 13/4045 |
| 2017/0315944 A1 | 11/2017 | Mayer et al. |
| 2018/0074572 A1 * | 3/2018 | Bauman ................ G06F 1/3287 |
| 2019/0243700 A1 * | 8/2019 | Brewer ................. G11C 7/1045 |
| 2020/0053678 A1 * | 2/2020 | Moon ................ H04W 56/005 |
| 2020/0059427 A1 * | 2/2020 | Lang .................... H04L 69/16 |
| 2020/0112975 A1 * | 4/2020 | Moon ................ H04W 56/005 |
| 2020/0178355 A1 * | 6/2020 | Shelby ................ H04W 88/16 |

OTHER PUBLICATIONS

Nachiket Kapre, et al., Hoplite: Building Austere Overlay NoCs for FPGAs, pp. 1-8.

Nachiket Kapre, et al., Hoplite: A Deflection-Routed Directional Torus NoC for FPGAs, ACM Trans. Reconfig Technol. Syst. 1,2, Article 3 (Apr. 2016), 24 pages.

SmartConnect v1.0, LogiCORE IP Product Guide, Vivado Design Suite, PG247 Feb. 3, 2020, 55 pages.

* cited by examiner

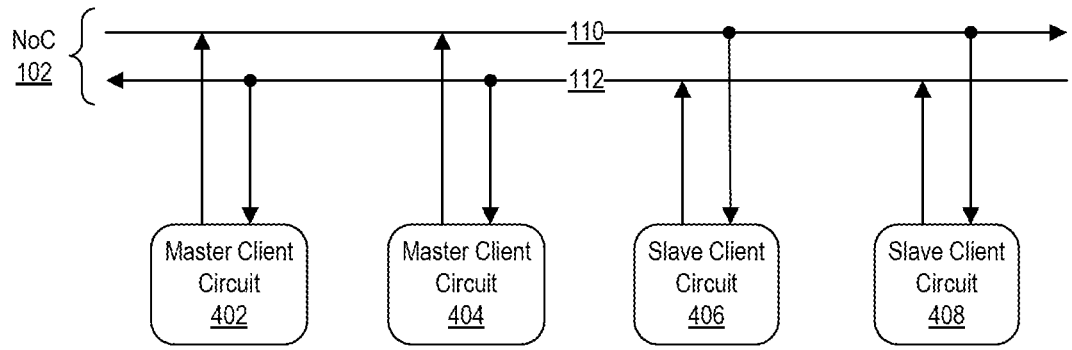
FIG. 4
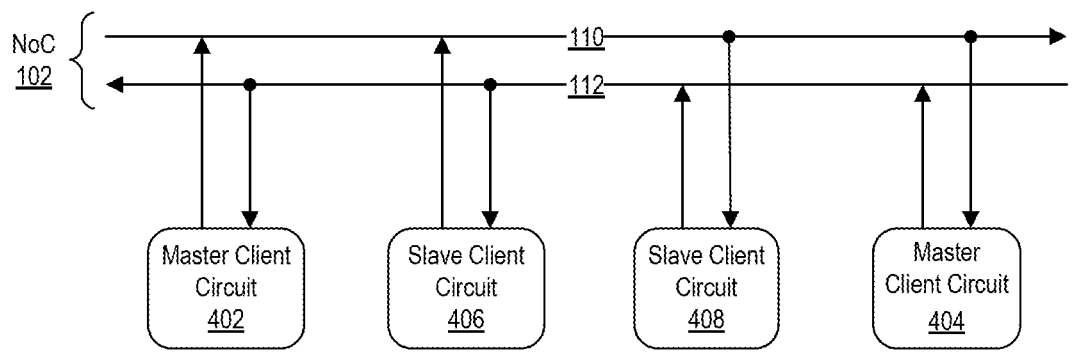
FIG. 5
| Channel | AR | AW | W | R | B |
|---|---|---|---|---|---|
| Conventional NoC | 169 | 169 | 591 | 531 | 5 |
| Enhanced NoC | | | 576 | 516 | |
FIG. 6

PACKET-BASED AND TIME-MULTIPLEXED NETWORK-ON-CHIP

TECHNICAL FIELD

This disclosure relates to integrated circuits (ICs) and, more particularly, to ICs having a Network-on-Chip capable of packet-based and time-multiplexed communication.

BACKGROUND

Modern integrated circuits (ICs) are often required to move large amounts of data across the chip. New applications implemented in ICs, for example, may need to exchange large amounts of data between two or more different circuit blocks located on the IC and/or between one or more circuit blocks on the IC and one or more other circuit blocks located off-chip such as a memory or another external device. The data must be moved without compromising performance of the IC and without utilizing such a large amount of IC resources that other functionality of the IC such as compute power is sacrificed.

Some ICs utilize a "Network-on-Chip" or "NoC" to move data. A NoC generally refers to a network-based system implemented on an IC. The NoC is capable of exchanging communications between different circuit blocks on the IC. Many existing NoC technologies require a significant amount of IC resources such as wires or other electronic components for implementation. The use of these resources to create the NoC means that the resources are not available for purposes other than moving data. Moreover, the large amount of resources needed for NoC implementation means that the NoC consumes a large amount of area on the IC thereby reducing the area of the IC that is available for performing non-data movement functions such as compute.

SUMMARY

In one aspect, an integrated circuit (IC) can include a Network-on-Chip (NoC). The NoC can include a router network having a first shared physical channel and a second shared physical channel. The NoC can include one or more master bridge circuits coupled to the router network, wherein each master bridge circuit provides a packet-based interface to a master client circuit coupled thereto for initiating transactions over the router network. Each master bridge circuit can be configured to send and receive data for the transactions over the router network as flits of packets according to a schedule. The NoC can include one or more slave bridge circuits coupled to the router network, wherein each slave bridge circuit provides a packet-based interface to a slave client circuit coupled thereto to for responding to the transactions over the router network. Each slave bridge circuit can be configured to send and receive the flits of packets for the transactions over the router network according to the schedule. The flits of packets sent from different client circuits are interleaved using time-multiplexing on the first shared physical channel and the second shared physical channel.

In another aspect, a method of data transfer within an IC includes providing a router network coupled to a plurality of bridge circuits, wherein each bridge circuit is connected to a client circuit. Each bridge circuit can provide a packet-based interface to the client circuit connected thereto. The method can include sending and receiving, over the router network and by the plurality of bridge circuits, flits of packets for transactions initiated by the client circuits. The plurality of bridge circuits perform the sending and receiving according to a schedule. The method also can include conveying, over a first shared physical channel and a second shared physical channel of the router network, the flits of packets corresponding to different ones of the client circuits concurrently using time-multiplexing.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 illustrates an example of a NoC with multiple master client circuits and multiple slave client circuits.

FIG. 5 illustrates another example of a NoC with multiple master client circuits and multiple slave client circuits.

FIG. 6 is a table illustrating an example of the reduction in routing resources achievable using a NoC in accordance with the inventive arrangements.

DETAILED DESCRIPTION

Figure 1:
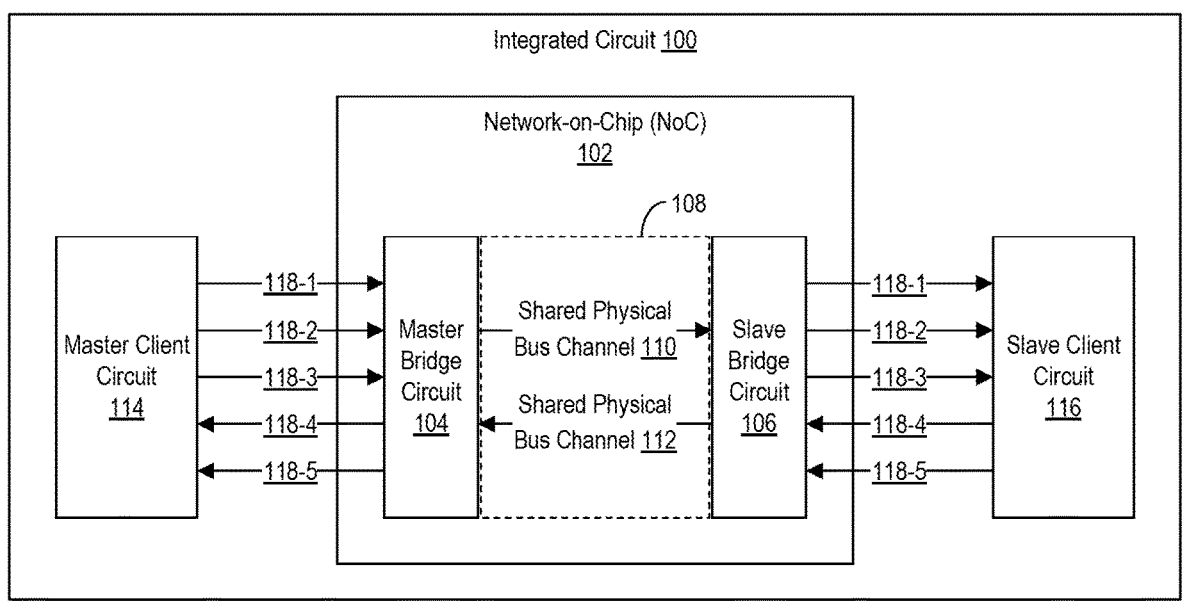
FIG. 1 illustrates an example of an integrated circuit (IC) having a Network-on-Chip (NoC).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to ICs having a Network-on-Chip (NoC). In accordance with the inventive arrangements described within this disclosure, a NoC is provided that utilizes a hybrid approach. The hybrid approach combines both packet-based communications and time-multiplexed communications. Bandwidth on the NoC is allocated by way of a static allocation process used to generate a schedule.

A conventional NoC typically employs a 5-port mesh network topology to carry packetized data among the various client circuits connected to the NoC. Source circuit blocks send entire packets of data through the NoC to destination circuit blocks using a local arbitration scheme. The local arbitration scheme is implemented by distributing first-in-first-out (FIFO) buffers throughout the NoC. The FIFO buffers may be inserted between the routers or incorporated into the routers forming the NoC such that each router in the NoC is effectively buffered. The FIFO buffers implement the arbitration scheme by allowing high priority packets to pass low priority packets as the packets travel intact through the NoC. For example, a conventional NoC may carry both low and high priority packets concurrently. The FIFO buffers exert back pressure on the NoC forcing the lower priority packet to stop, at least momentarily, while the higher priority packet passes. The lower priority packet may then continue traversing through the NoC at the appropriate time.

One or more of the example NoC implementations described within this disclosure utilize a topology having a reduced number of ports compared to conventional NoC implementations that have a 5-port mesh topology. The example NoC implementations also may be implemented using a bufferless topology. A bufferless topology refers to one that excludes or omits buffers between routers or within the routers of the NoC. The example NoC implementations utilize an arbitration scheme, or schedule, that is enforced globally near the client circuits coupled to the NoC. That is, the arbitration scheme is enforced at the edge of the NoC thereby allowing the FIFO buffers found in conventional NoC solutions to be removed.

In one or more example NoC implementations, schedule controllers are included at attachment points of the NoC to control injection of data into the NoC and extraction of data from the NoC at the respective attachment points. Using schedule controllers as described herein, multi-flit packets may be sent through the NoC over shared physical channels. That is, packetized data may be sent through the NoC with the flits of different packets entering the NoC and being time-multiplexed onto the shared physical channels based on the schedule observed by the respective schedule controllers at the attachment points. As such, packets from multiple, different client circuits may traverse the NoC concurrently according to the schedule. While flits of different packets corresponding to different client circuit blocks may be comingled or interleaved while traversing the NoC due to time-multiplexing, flits of any single packet arrive at the destination node of the NoC in the correct packet order. Accordingly, in one or more example implementations, the NoC uses a virtual queuing mechanism to organize flits received at destination attachment points. The flits may be output from the NoC so that the client circuits receive the data, e.g., flits, in packet order using a wormhole type of approach.

The example NoC implementations described herein may include two shared physical channels configured to convey data in different directions. For example, a first shared physical channel is capable of conveying data in a first direction while a second shared physical channel is capable of conveying data in a second direction. The second direction may be opposite the first direction. Each of the first and second shared physical channels may convey data corresponding to one or more different logical channels. For example, due to the time-multiplexing of flits, each of the first and second shared physical channels may convey master-to-slave directed data and/or slave-to-master directed data depending on the system topology and schedule.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example implementation of an IC 100 having a network-based subsystem such as a NoC 102. IC 100 may be any of a variety of different types of IC. In one aspect, IC 100 may be implemented as a programmable IC. A programmable IC is an IC that includes at least some programmable circuitry (e.g., programmable logic). A field programmable gate array (FPGA) is an example of a programmable IC. In another aspect, IC 100 may be implemented using hardwired circuitry. For example, IC 100 may be an Application Specific IC (ASIC). In still another aspect, IC 100 may be implemented as a System-on-Chip that includes one or more interconnected systems. An SoC may include programmable logic as one of the systems. Accordingly, NoC 102 may be implemented using entirely programmable circuitry, entirely using hardwired circuitry, or using a combination of programmable circuitry and hardwired circuitry.

In an example implementation, IC 100 may be formed of a single die. That is, IC 100 may include a single die within an IC package. In another aspect, IC 100 maybe formed of two or more interconnected dies within a single IC package. The particular examples of different types of ICs and/or IC architectures provided herein are intended for purposes of illustration and not limitation. The particular type of IC in which NoC 102 is implemented is not intended as a limitation.

NoC 102 includes a master bridge circuit 104, a slave bridge circuit 106, and a router network 108. Router network 108 can include a shared physical channel 110 and a shared physical channel 112. A master client circuit 114 is connected to master bridge circuit 104. A slave client circuit 116 is connected to slave bridge circuit 106. For purposes of illustration, the term "client circuit" is intended to refer to circuits and/or circuit blocks that connect to NoC 102 for purposes of exchanging data over NoC 102.

In the example of FIG. 1, master client circuit 114 is capable of initiating read transactions and write transactions over NoC 102 with respect to slave client circuit 116. As an illustrative example, master client circuit 114 may be configured to perform particular computations while slave client circuit 116 may be implemented as a memory controller configured to communicate with an off-chip or external memory.

Master client circuit 114 connects to master bridge circuit 104 via a plurality of bus channels 118. Bus channels 118 include a plurality of read channels and a plurality of write channels. In one example implementation, bus channel 118-1 may be a write control channel configured to convey write control data. Bus channel 118-2 may be a write data channel configured to convey write data. Bus channel 118-3 may be a read control channel configured to convey read control data. Bus channel 118-4 may be a read data channel configured to convey read data. Bus channel 118-5 may be a write response channel configured to convey write response data.

For example, write control data may specify address information indicating the particular address of the destination to which data is to be written as part of a write transaction. Write data may be the particular data or information to be written to the destination as part of the write transaction. Write response data may specify an acknowledgement that the data of the write transaction was successfully written to the intended destination. Read control data may specify address information indicating the particular address of a destination from which data is to be read and the amount of data to be read as part of a read transaction. Read data may be the particular data or information that is to be read as part of the read transaction.

In an example implementation, bus channels 118 may be implemented as a communication bus and/or channels that comply with the Advanced Microcontroller Bus Architecture (AMBA) eXtensible Interface (AXI) (hereafter "AXI") protocol. AXI defines an embedded microcontroller bus interface for use in establishing on-chip connections between compliant circuit blocks and/or systems. For purposes of illustration, bus channel 118-1 may be an AXI-AW channel; bus channel 118-2 an AXI-W channel; bus channel 118-3 an AXI-AR channel; bus channel 118-4 an AXI-R channel; and bus 118-5 an AXI-B channel.

AXI is provided as an example of a communication bus and is not intended as a limitation of the particular types of communications channels and/or connection with which the inventive arrangements may be used. It should be appreciated that other similar and/or equivalent protocols, communication buses, bus interfaces, and/or interconnects may be used in lieu of AXI and that the various example circuit blocks and/or signals provided within this disclosure will vary based on the particular protocol, communication bus, bus interface, and/or interconnect that is used.

In the example of FIG. 1, master bridge circuit 104 is capable of combining bus channels 118-1, 118-2, and 118-3 onto shared physical channel 110. For example, master bridge circuit 104 is capable of combining or folding data received on bus channels 118-1, 118-2, and 118-3 together and sending such data over shared physical channel 110. In the example, shared physical channel 110 effectively implements a forward logical channel. As defined within this disclosure, the term "a forward logical channel" means a logical communication channel that conveys data in a master-to-slave direction (e.g., from a master client circuit to a slave client circuit). In the example of FIG. 1, the forward logical channel includes data received over bus channels 118-1, 118-2, and 118-3 (e.g., the write control channel, the write data channel, and the read control channel).

As part of folding the bus channels together, master bridge circuit 104 is capable of serializing the data received on bus channels 118-1, 118-2, and 118-3 onto shared physical channel 110 (e.g., a single physical channel). In doing so, master bridge circuit 104 is capable of time-multiplexing data corresponding to read and/or write transactions received via bus channels 118-1, 118-2, and 118-3 onto shared physical channel 110.

Slave bridge circuit 106 is capable of receiving read and/or write transactions from master client circuit 114 via shared physical channel 110. Slave bridge circuit 106 is capable of demultiplexing the data for the read and/or write transactions and outputting the deserialized data onto bus channels 118-1, 118-2, and 118-3 as appropriate. In outputting data onto bus channels 118-1, 118-2, and 118-3, slave bridge circuit 106 is capable of outputting the data on each of the bus channels 118-1, 118-2, and 118-3 so that slave client circuit 116 receives packetized data.

Slave bridge circuit 106 is capable of combining bus channels 118-4 and 118-5 onto shared physical channel 112. For example, slave bridge circuit 106 is capable of combining or folding data received on bus channels 118-4 and 118-5 together and sending such data over shared physical channel 112. As defined within this disclosure, the term "backward logical channel" means a logical communication channel that conveys data in a slave-to-master direction (e.g., from a slave client circuit to a master client circuit). In the example, the backward logical channel may include data received over bus channels 118-4 and 118-5 (e.g., the read data channel and the write response channel).

As part of folding the bus channels together, slave bridge circuit 106 is capable of serializing data received on bus channels 118-4 and 118-5 onto shared physical channel 112 (e.g., a single physical channel). In doing so, slave bridge circuit 106 is capable of time-multiplexing data corresponding to the initiated read and/or write transactions received via bus channels 118-4 and 118-5 onto shared physical channel 112.

Master bridge circuit 104 is capable of receiving data, e.g., response data for read and/or write transactions, from slave client circuit 116 via shared physical channel 112. Master bridge circuit 104 is capable of demultiplexing the data for the read and/or write transactions and outputting the deserialized data onto bus channels 118-4 and 118-5 as appropriate. In outputting data onto bus channels 118-4 and 118-5, master bridge circuit 104 is capable of outputting the data on each of bus channels 118-4 and 118-5 so that master client circuit 114 receives packetized data.

In the example NoC implementations described herein, master client circuit 114 provides packetized data to master bridge circuit 104 via bus channels 118-1, 118-2, and 118-3 and receives packetized data from master bridge circuit 104 via bus channels 118-4 and 118-5. Slave client circuit 116 provides packetized data to slave bridge circuit 106 via bus channels 118-4 and 118-5 and receives packetized data from slave bridge circuit 106 via bus channels 118-1, 118-2, and 118-3. Packetized data may be provided to each of master client circuit 114 and slave client circuit 116 using "wormhole routing."

Wormhole routing refers to operation of a wormhole router where a packet does not have to be fully buffered (e.g., buffered in master bridge circuit 104 or slave bridge circuit 106) prior to transferring the packet to the destination client circuit. For example, parts of a packet that is received or reformed in master bridge circuit 104 may be transferred to master client circuit 114. Similarly, parts of a packet that is received or reformed in slave bridge circuit 106 may be transferred to slave client circuit 116. Other parts of such packets may exist in other portions of NoC 102 and/or the sending client circuits, for example.

Figure 2:
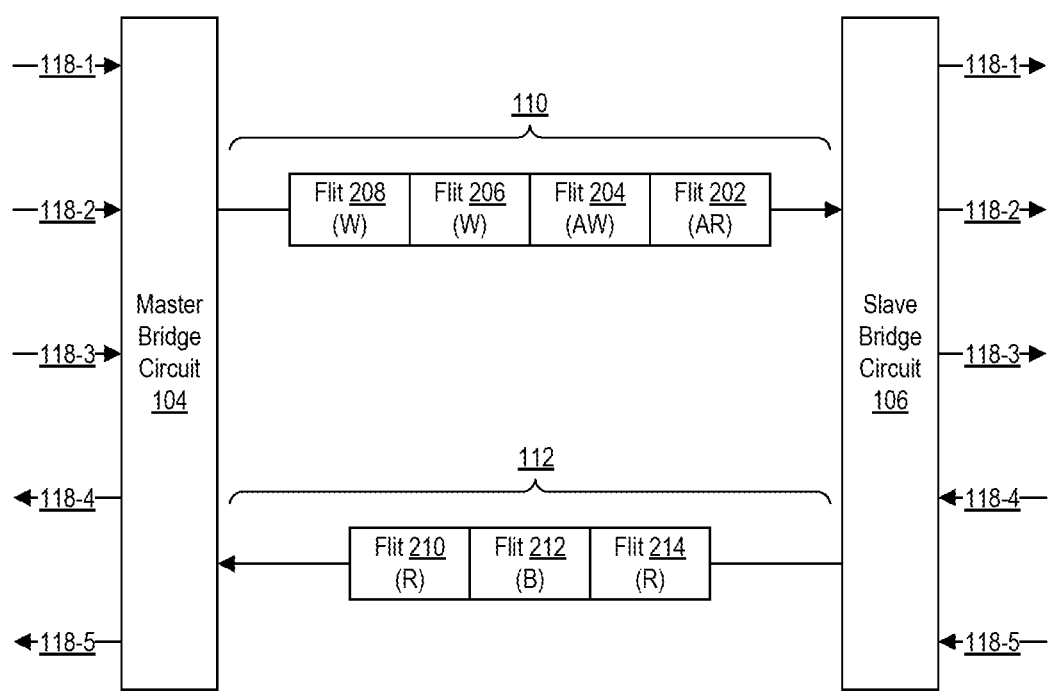
FIG. 2 illustrates an example of shared physical channels within a NoC.

FIG. 2 illustrates an example of shared physical channels 110 and 112 implemented within NoC 102. In the example of FIG. 2, master bridge circuit 104 receives packets of data over bus channels 118-1, 118-2, and 118-3. Master bridge circuit 104 is capable of subdividing the packets into constituent flits 202, 204, 206, and 208, time-multiplexing flits 202, 204, 206, and 208, and placing the time-multiplexed flits 202, 204, 206, and 208 onto shared physical channel 110. In the example, shared physical channel 110 implements a forward logical channel.

Slave bridge circuit 106 is capable of receiving the time-multiplexed flits of data and demultiplexing flits 202, 204, 206, and 208 to form packetized data. Slave bridge circuit 106 is further capable of outputting the packetized data back onto bus channels 118-1, 118-2, and 118-3, respectively.

Slave bridge circuit 106 receives packetized data, e.g., response data for the transactions initiated by master bridge circuit 104, over bus channels 118-4 and 118-5. Slave bridge circuit 106 is capable of subdividing the packetized data into constituent flits 210, 212, and 214, time-multiplexing flits 210, 212, and 214, and placing the time-multiplexed flits 210, 212, and 214 onto shared physical channel 112. In the example, shared physical channel 112 implements a backward logical channel.

Master bridge circuit 104 is capable of receiving the time-multiplexed flits 210, 212, and 214 and demultiplexing flits 210, 212, and 214 into packetized data. Master bridge circuit 104 is further capable of outputting the packetized data onto bus channels 118-4 and 118-5.

In the example NoC implementations described herein, data conveyed over the NoC may be time-multiplexed in multiple ways. In one aspect, for example, data from the different bus channels 118 may be time-multiplexed onto a given shared physical channel as illustrated in FIG. 2 where multiple bus channels 118 are folded onto a single shared physical channel.

In another aspect, each bridge circuit is configured to provide a packet-based interface to the client circuit that is connected thereto. Each client circuit interacts with NoC 102 as if sending and receiving packet-based data despite NoC 102 sending data over shared physical channel 110 and/or shared physical channel 112 as time-multiplexed flits. From the client circuit perspective, NoC 102 functions as a packet-based or packet-switched architecture where packets are transferred seemingly together as complete packets.

In addition, in cases where more than two client circuits communicate over NoC 102, flits of data from the client circuits are time-multiplexed on shared physical channels 110 and/or 112. For example, NoC 102 may be connected to three or more client circuits that include two or more master client circuits, two or more slave client circuits, or two or more master client circuits and two or more slave client circuits. In such cases, flits of data from the different client circuits are interleaved on shared physical channels 110 and/or 112 according to a schedule. The architecture described herein may be contrasted with other packet-switched networks where one master client circuit obtains complete control over the network while sending a packet and that packet is sent without flits of other packets corresponding to other client circuits commingled therein.

Figure 3:
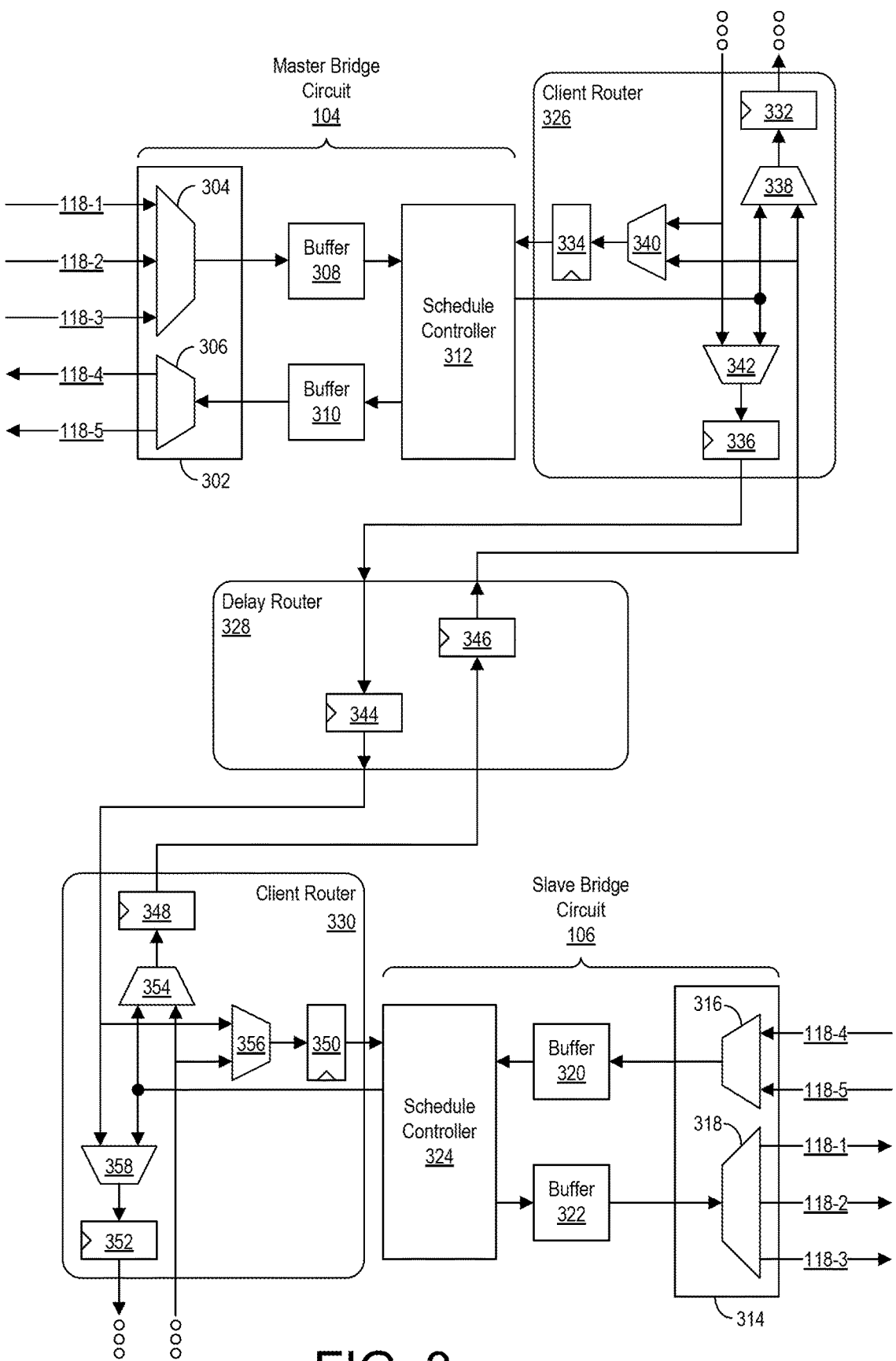
FIG. 3 illustrates another example of a NoC.

FIG. 3 illustrates another example of NoC 102. In the example, master bridge circuit 104 and slave bridge circuit 106 each connect to router network 108. Router network 108 is formed of one or more client routers and optionally one or more delay routers. In the example, router network 108 includes a client router 326, a delay router 328, and a client router 330. In general, each master bridge circuit of NoC 102 is connected to a client router. For example, master bridge circuit 104 connects to client router 326. Similarly, each slave bridge circuit of NoC 102 is connected to a client router. Slave bridge circuit 106 connects to client router 330.

With delay routers being optional, client routers may be directly connected to one another or connected to one another through one or more intervening delay routers. As such, a pair of client routers may be directly connected where no delay routers are located between the client routers of the pair. Alternatively, a pair of client routers may be connected by one or more intervening delay routers. In the example of FIG. 3, the pair of client routers 326, 330 is connected by intervening delay router 328. In other examples, including three or more client routers, one or more pairs of client routers may be directly connected while other pairs of client routers are connected by one or more intervening delay routers. In a given NoC implementation, whether delay routers are used, where the delay routers are used, and the number of delay routers included if used may be determined based on the electronic system being designed and the need or requirement for the NoC to operate at a particular frequency.

Interface 302 is capable of sending and receiving packetized data over bus channels 118. In one aspect, interface 302 may be implemented as an AXI interface. Interface 302 can include a switch 304 and a switch 306. In one aspect, switch 304 may be implemented as a multiplexer while switch 306 is implemented as a demultiplexer. Switch 304 is capable of receiving packets of data on each of bus channels 118-1, 118-2, and 118-3 from a master client circuit and subdividing the packets received on bus channels 118-1, 118-2, and 118-3 into flits. Switch 304 also is capable of adding sideband information to the flits. For example, sideband information may include, but is not limited to, information specifying the destination client router (e.g., the destination client router address) and/or information specifying the particular bus channel, e.g., 118-1, 118-2, or 118-3 in this case, from which the data of the flit was obtained. Switch 304 is capable of adding the sideband information into the respective flits of a packet that are created. Switch 304 further is capable of time-multiplexing the flits and outputting the flits to buffer 308.

In an example implementation, each of buffers 308, 310, 320, and 322 is implemented as an asynchronous buffer where the circuitry between interfaces 302 and 314 operates at a different frequency than the client circuits outside of NoC 102 that connect to the master bridge circuits and the slave bridge circuits. For example, the master client circuit connected to master bridge circuit 104 and/or the slave client circuit connected to slave bridge circuit 106 may operate at a different clock frequency or frequencies than schedule controllers 312, 324 and router network 108 of NoC 102. This means that NoC 102 may operate at a higher frequency than the surrounding circuitry connected thereto. Accordingly, buffers 308, 310, 320, and 322 are capable of providing clock domain crossing. Still, in other example implementations, NoC 102 may operate at the same clock frequency as the surrounding circuitry.

Regarding the data received via bus channels 118-1, 118-2, and 118-3, schedule controller 312 is capable of managing the injection time of data traffic, e.g., flits, onto router network 108. Schedule controller 312 is also capable of tracking tokens indicating destination buffer occupancy. In an example implementation, schedule controller 312 is capable of pulling flits of data from buffer 308 and sending the flits of data over router network 108 in response to determining that the flits of data have an allocated time slot for the destination bridge circuit and that tokens are available indicating that buffer space is available at the destination bridge circuit. The time slots on which data may be injected onto router network 108 by schedule controller 312 are specified by a schedule that is followed by schedule controller 312.

In an example implementation, each of buffers 308, 310, 320, and 322 may be configured to implement a plurality of virtual queues. Each virtual queue may be implemented as a logically separate or distinct address space for buffering data. Referring to buffer 308 as an example, buffer 308 may have sufficient storage space to store 32 data elements or packets. These data elements may be subdivided into 2 virtual queues each having 16 data elements, 4 virtual queues each having 8 data elements, or other number of virtual queues.

In one example implementation, each virtual queue is associated with a time slot of the schedule followed by schedule controllers 312 and 324. The association of each virtual queue with a time slot results in each virtual queue being associated with a particular destination or attachment point on NoC 102. Referring to buffer 308, for example, as data is received from a master client circuit connected thereto, the data may be stored in a particular virtual queue based on the time slot of the schedule that the data is to be placed or inserted onto router network 108 for the intended destination. Buffer 308, for example, includes one virtual queue for each of the different slave client circuits with which the master client circuit connected to master bridge circuit 104 communicates. If, for example, the master client circuit connected to master bridge circuit 104 communicates with two different slave client circuits via respective slave bridge circuits on NoC 102, buffer 308 includes one buffer for each of the two slave bridge circuits. Data received via bus channels 118-1, 118-2, and 118-3 is directed into the virtual queue associated with the destination of that data.

Similarly, as data is received from router network 108, data may be stored in a particular virtual queue of buffer 310 based on the time slot of the schedule that the data was placed or inserted onto router network 108. Buffer 310 also includes one virtual queue for each of the different slave client circuits with which the master client circuit connected to master bridge circuit 104 communicates. Continuing with the same example where the master client circuit connected to master bridge circuit 104 communicates with two different slave client circuits via respective slave bridge circuits, buffer 310 includes one buffer for each of the two slave bridge circuits. Data received from schedule controller 312 is directed into the correct virtual queue of buffer 310 based on the slave client circuit and corresponding slave bridge circuit that sent the data.

Switch 306 is capable of demultiplexing data received over a shared physical channel and read from buffer 310. Switch 306 is capable of outputting the demultiplexed data over bus channels 118-4 and 118-5 as packetized data. In one aspect, switch 306 is capable of using the sideband information inserted into the flits by switch 316 to place the flits onto the correct bus channels 118-4 and 118-5.

Schedule controller 312 is capable of storing received flits of data in buffer 310 in virtual queues. As discussed, each virtual queue corresponds to a particular time slot so that each virtual queue of buffer 310 stores flits of data from a particular slave bridge circuit. Interface 302 is capable of pulling data from the virtual queues so as to pull data from buffer 310 and outputting that data as packetized data onto bus channel 118-4 or 118-5.

It should be appreciated that the number of flits in a packet may be larger than the size of a virtual queue. As such, interface 302 is capable of pulling the flits from the virtual queues and outputting the flits in packet order on the respective bus channels using wormhole routing. In one aspect, in pulling data from buffer 310, switch 306 is capable of removing any sideband information when combining or concatenating the data portions of the flits of a virtual queue so as to output correct packetized data. Accordingly, while data is transferred over router network 108 in a time-multiplexed manner with flits of different packets that may correspond to different master and/or slave client circuits interleaved, data traffic output from NoC 102 and received by a client circuit is received as one or more fully formed packets.

Interface 314 is capable of sending and receiving packetized data over bus channels 118. In one aspect, interface 314 may be implemented as an AXI interface. Interface 314 can include a switch 316 and a switch 318. In one aspect, switch 316 may be implemented as a multiplexer while switch 318 is implemented as a demultiplexer. Switch 316 is capable of receiving packets of data on each of bus channels 118-4 and 118-5 from a slave client circuit and subdividing the packets into flits. Switch 316 is capable of adding sideband information to the flits. For example, sideband information may include, but is not limited to, information specifying the destination client router (e.g., the destination client router address) and/or information specifying the particular channel, e.g., 118-4 or 118-5 in this case, from which the data of the flit was obtained. Switch 316 is capable of adding the sideband information into the respective flits of a packet that are created. Switch 316 further is capable of outputting the flits to buffer 320.

In an example implementation, the flits are stored in different virtual queues of buffer 320 where each virtual queue corresponds to a time slot of the schedule for injecting data onto router network 108. Buffer 320, for example, includes one virtual queue for each of the different master client circuits with which the slave client circuit connected to slave bridge circuit 106 communicates. If, for example, the slave client circuit connected to slave bridge circuit 106 communicates with two different master client circuits via respective master bridge circuits, buffer 320 includes one virtual queue for each of the two master bridge circuits.

Regarding the data received via bus channels 118-4 or 118-5, schedule controller 324 is capable of pulling data from multiple ones of the virtual queues of buffer 320. Schedule controller 324 is also capable of managing the injection time of flits onto router network 108.

In an example implementation, schedule controller 324 is capable of tracking tokens indicating destination buffer occupancy. Schedule controller 324 is capable of pulling flits of data from buffer 320 and sending the flits of data over router network 108 in response to determining that the flits of data have an allocated time slot for the destination bridge circuit and that tokens are available indicating that buffer space is available at the destination bridge circuit. In one or more example implementations, slave bridge circuit 106 is capable of storing identifying information for the originating master client circuit from which a transaction is received so that the response can be provided to the correct master client circuit. Schedule controller 324, for example, may store such information for received transactions.

Schedule controller 324 is also capable of receiving data from router network 108 and pushing received data into appropriate virtual queues of buffer 322 based on the particular time slot that the data arrives, per the schedule. The storage of flits of data into different virtual queues of buffer 322 based on the arrival time slot and the schedule allows schedule controller 324 to receive flits of data from multiple different master client circuits that may be interleaved and separate the flits into particular virtual queues, wherein each virtual queue corresponds to one master client circuit. Further, since the flits traverse router network 108 in the correct order corresponding to the original packet and arrive at the destination in that order, the flits are placed in each respective virtual queue in the correct order corresponding to the original packets that were sent.

Interface 314, for example switch 318, is capable of pulling data from multiple virtual queues of buffer 322. Switch 318 is further capable of arbitrating between the virtual queues. In one example implementation, switch 318 arbitrates between the virtual queues using a round robin technique. Switch 318 is capable of demultiplexing data received from buffer 322 and outputting the demultiplexed data onto bus channels 118-1, 118-2, and 118-3. For example, switch 318 is capable of obtaining the flits of packets from virtual queues of buffer 322 and sending packetized data out over bus channels 118-1, 118-2, and/or 118-3. In one aspect, switch 318 is capable of using the sideband information inserted into the flits by master bridge circuit 104 to place the flits onto the correct bus channels 118-1, 118-2, and 118-3.

In pulling data from buffer 322, switch 318 is capable of removing any sideband information from the flits so that the data portions of the flits of a virtual queue may be combined or concatenated so as to output correctly formed packetized data. Accordingly, while data is transferred over router network 108 in a time-multiplexed manner with flits of different packets corresponding to different bus channels and/or different client circuits interleaved, data traffic output from NoC 102 is received by client circuits as fully formed packets.

Client router 326 includes a plurality of registers 332, 334, and 336 and a plurality of switches 338, 340, and 342. In one aspect, switches 338, 340, and 342 may be implemented as multiplexers or other interconnects. Each of registers 332, 334, and 336 is clocked to move data in accordance with clock signals (not shown) provided to router network 108. In one aspect, schedule controller 312 is capable of placing flits onto client router 326 according to the schedule thereby controlling the flow of flits into client router 326 and router network 108. The data may be provided to client router 326 and passed by either switch 338 to move data in the up or north direction or switch 342 to pass data in the down or south direction based on the destination address specified in the sideband information in the flits. Switch 338 passes data fed into client router 326 from schedule controller 312 and data received from the node of router network 108 to the south, e.g., delay router 328 in this example, based on the sideband information. Similarly, switch 342 passes data fed into client router 326 from schedule controller 312 or data received from the node of router network 108 to the north (not shown in the example of FIG. 3) based on the sideband information.

Switch 340 passes data received from a node of router network 108 to the north of client router 326 or data received from a node of router network 108 to the south of client router 326 (e.g., delay router 328) to schedule controller 312 based on the sideband information contained in the received flits. For example, switch 340 is capable of detecting whether a flit is intended for the master client circuit attached thereto and steer the incoming flit to schedule controller 312. Schedule controller 312, based on the schedule, is expecting the flit during the time slot and stores the flit in a correct virtual queue.

For example, switches 338, 340, and 342 are capable of comparing addresses of flits contained in the sideband information for each flit against the address of client router 326 and selectively forwarding such flits. In response to determining that the address of a flit matches the address of client router 326, switch 340 redirects the flit toward schedule controller 312 and invalidates the flit on other outgoing ports of switches 338 and 342.

Delay router 328 may include clocked registers 344 and 346. In one aspect, one or more delay routers 328 may be inserted between consecutive client routers.

Client router 330 includes a plurality of registers 348, 350, and 352 and a plurality of switches 354, 356, and 358. In one aspect, switches 354, 356, and 358 may be implemented as multiplexers or other interconnects. Each of registers 348, 350, and 350 is clocked to move data in accordance with clock signals (not shown) provided to router network 108. In one aspect, schedule controller 324 is capable of placing flits onto client router 330 according to the schedule thereby controlling the flow of flits into client router 330 and router network 108. The data may be provided to client router 330 and passed by either switch 354 to move data in the up or north direction or switch 358 to pass data in the down or south direction based on the destination address specified in the sideband information in the flits. Switch 354 passes data fed into client router 330 from schedule controller 324 and data received from the node of router network 108 to the south (not shown) based on the sideband information. Similarly, switch 352 passes data fed into client router 330 from schedule controller 324 or data received from the node of router network 108 to the north (delay node 328 in the example of FIG. 3) based on the sideband information.

Switch 356 passes data received from a node of router network 108 to the north of client router 330 or data received from a node of router network 108 to the south of client router 330 to schedule controller 324 based on the sideband information contained in the received flits. For example, switch 356 is capable of detecting whether a flit is intended for the slave client circuit attached thereto and steer the incoming flit to schedule controller 324. Schedule controller 324, based on the schedule, is expecting the flit during the time slot and stores the flit in a correct virtual queue.

For example, switches 354, 356, and 358 are capable of comparing addresses of flits contained in the sideband information for each flit against the address of client router 330 and selectively forwarding such flits. In response to determining that the address of a flit matches the address of client router 330, switch 356 redirects the flit toward schedule controller 324 and invalidates the flit on other outgoing ports of switches 354 and 352.

As illustrated in the example of FIG. 3, router network 108 does not include buffering within the various router nodes or between the various router nodes. As noted, data is injected into router network 108 and extracted from router network 108 at the respective bridge circuits based on the schedule that is generated and followed by the respective bridge circuits.

In the example implementations described within this disclosure, data from multiple different master and/or slave client circuits may be interleaved while traversing router network 108. Though the data for multiple different master and/or slave client circuits may be interleaved, the data or flits for any particular master and/or slave client circuit traverse router network 108 in order. That is, flits of packets for a particular transaction enter router network 108 in packet order and arrive at the destination client router in packet order. Flits corresponding to packets of different master and/or slave circuit blocks may be stored upon arrival into different virtual queues to de-interleave the flits. As such, the flits stored in each individual queue will be in the correct order per the original packet that was sent.

In other conventional data mover circuits, flits may arrive at the destination node out of order. That is, the flits of a packet may arrive in an order that is different from that of the original packet. As such, the destination node must not only determine which flits correspond to which packets and/or sending client circuits, but the destination node must also re-arrange the flits of each packet once separated from other packets to place the flits of each respective packet in the correct order to reassemble the original packets. Compared to the inventive arrangements described herein, such operations require additional processing time and circuit complexity in the client circuits that connect to the NoC.

In the inventive arrangements described within this disclosure, the static scheduling and lack of deflection implemented by router network 108 ensures that flits arrive at destination nodes in the original packet order. Still, since multiple master client circuits may have data on the NoC concurrently, while data arrives at the destination node in order, the data may not arrive at the destination node one master (slave) client circuit at a time. Rather, the data for different master (slave) client circuits may be interleaved as received at the master (slave) bridge circuit. The flits need only be stored using the virtual queueing system described herein to separate interleaved flits of packets from different master (slave) client circuits.

In other conventional data mover circuits, scheduling is typically implemented in the client circuits that connect to the data mover circuits. That means that even in cases where static scheduling is used, such scheduling must be implemented in the various client circuits. If dynamic scheduling is used, then router network 108 includes substantially more complex circuitry allowing for internal buffering at each node. In accordance with the inventive arrangements described within this disclosure, the static scheduling is implemented at the edges of NoC 102 in the respective schedule controllers. This means that client circuits may connect to NoC 102 without having any knowledge of the scheduling that is implemented. Further, the client circuits are unaware of any time-division multiplexing taking place or the sharing of communication channels. From the client circuit perspective, and as such from an end user perspective designing client circuits, NoC 102 operates as a packet switched network using the same communication channel architecture and topology as the client circuits.

FIG. 4 illustrates an example of NoC 102 where each shared physical channel is used as a dedicated forward logical channel or a dedicated backward logical channel. In the example, master client circuits 402, 404 and slave client circuits 406, 408 are connected to NoC 102. Each of master client circuits 402, 404 and slave client circuits 406, 408 connects to NoC 102 through a corresponding master or slave bridge circuit that in turn connects to a client router. For purposes of illustration, the bridge circuits, client routers, and delay routers are not shown.

In the example of FIG. 4, master client circuits 402 and 404 initiate read and write transactions over shared physical channel 110. Shared physical channel 110 is used as a forward logical channel by master client circuits 402 and 404. Flits from master client circuits 402 and 404 are time-multiplexed over shared physical channel 110 based on the schedule. Slave client circuits 406, 408 respond to transactions initiated by master client circuits 402 and 404 over shared physical channel 112. Shared physical channel 112 is used as a backward logical channel by slave client circuits 406 and 408. Flits from slave client circuits 406 and 408 are time-multiplexed on shared physical channel 112 based on the schedule.

Shared physical channels 110 and 112 allow NoC 102 to utilize fewer routing resources (wires and circuit components) than conventional data mover circuits. While reducing the number of routing resources to implement NoC 102 is useful, the reduction in routing resources may be particularly beneficial in cases where NoC 102 spans more than one die in a multi-die IC. The amount of routing resources used by NoC 102, for example, may be reduced by approximately one-half compared to other data mover circuit implementations where the channels are not folded (e.g., serialized) and time-multiplexed.

FIG. 5 illustrates an example implementation of NoC 102 where each of the shared physical channels is used as both a forward logical channels and a backward logical channel. Master client circuit 402 initiates read and write transactions with slave client circuit 408 over shared physical channel 110. Master client circuit 402 uses shared physical channel 110 as a forward logical channel. Slave client circuit 408 responds to transactions initiated by master client circuit 402 over shared physical channel 112. Slave client circuit 408 uses shared physical channel 112 as a backward logical channel.

Master client circuit 404 initiates read and write transactions with slave client circuit 406 over shared physical channel 112. Master client circuit 404 uses shared physical channel 112 as a forward logical channel. Slave client circuit 406 responds to transactions initiated by master client circuit 404 over shared physical channel 110. Slave client circuit 406 uses shared physical channel 110 as a backward logical channel.

Conventional data mover circuit implementations are unable to use a particular physical channel as both a forward logical channel and a backward logical channel. For example, in conventional data mover circuits, the AR, AW, and W channels of an AXI implementation may not share routing resources of R and B channels even in cases where such channels communicate in the same direction. Referring to the example of example of FIG. 5 where master client circuit 402 initiates a transaction to slave client circuit 408 and master client circuit 404 initiates a transaction to slave client circuit 406, in conventional data mover circuit implementations, master client circuit 404 may not use R and B signal lines used by slave client circuit 408 to initiate a read or write transaction to slave client circuit 406. The example implementations described herein allow any shared physical channel to be used as a forward or a backward logical channel.

FIG. 6 is a table illustrating an example of the reduction in routing resources that may be obtained using a NoC as described within this disclosure. The table of FIG. 6 illustrates that in the conventional NoC case, a width of 1,465 bits is needed to route 5 channels (AR, AW, W, R, and B in the case of an AXI implementation). In the case of the enhanced NoC as described within this disclosure, the forward channel may be implemented with a width of 576 bits. The backward channel may be implemented with a width of 516 bits. The enhanced NoC may have a total width of 1,092 bits providing a 30% reduction in width over the conventional NoC implementation.

In one or more example implementations, the width of the forward channel may be limited in size to the widest channel being folded in the forward direction. Referring to the example of FIG. 6, the widest channel being folded in the forward direction is the W channel having a width of 591 bits. As such, the forward channel for the enhanced NoC may be implemented as 591 bits. In some cases, certain fields of data may not be needed or used. In such cases, the number of bits may be further reduced below the size of the largest channel to be folded. In the example of FIG. 6, the width of the forward channel for the enhanced NoC may be reduced down to 576 bits by removing certain fields not needed in the enhanced NoC implementation.

Similarly, the size of the backward channel for the enhanced NoC may be size limited to 531 bits in width, which is the size of the largest channel being folded in the backward direction. By removing unnecessary fields, the size of the backward channel for the enhanced NoC may be reduced down to 516 in the example of FIG. 6.

In example implementations such as those where the same shared physical channel may be used as the forward and backward logical channels, the shared physical channel may have a width set to the larger of the two logical channels. In the example of FIG. 5, for example, each shared physical channel may have a width that is the wider of the forward logical channel and the reverse logical channel.

Figure 7:
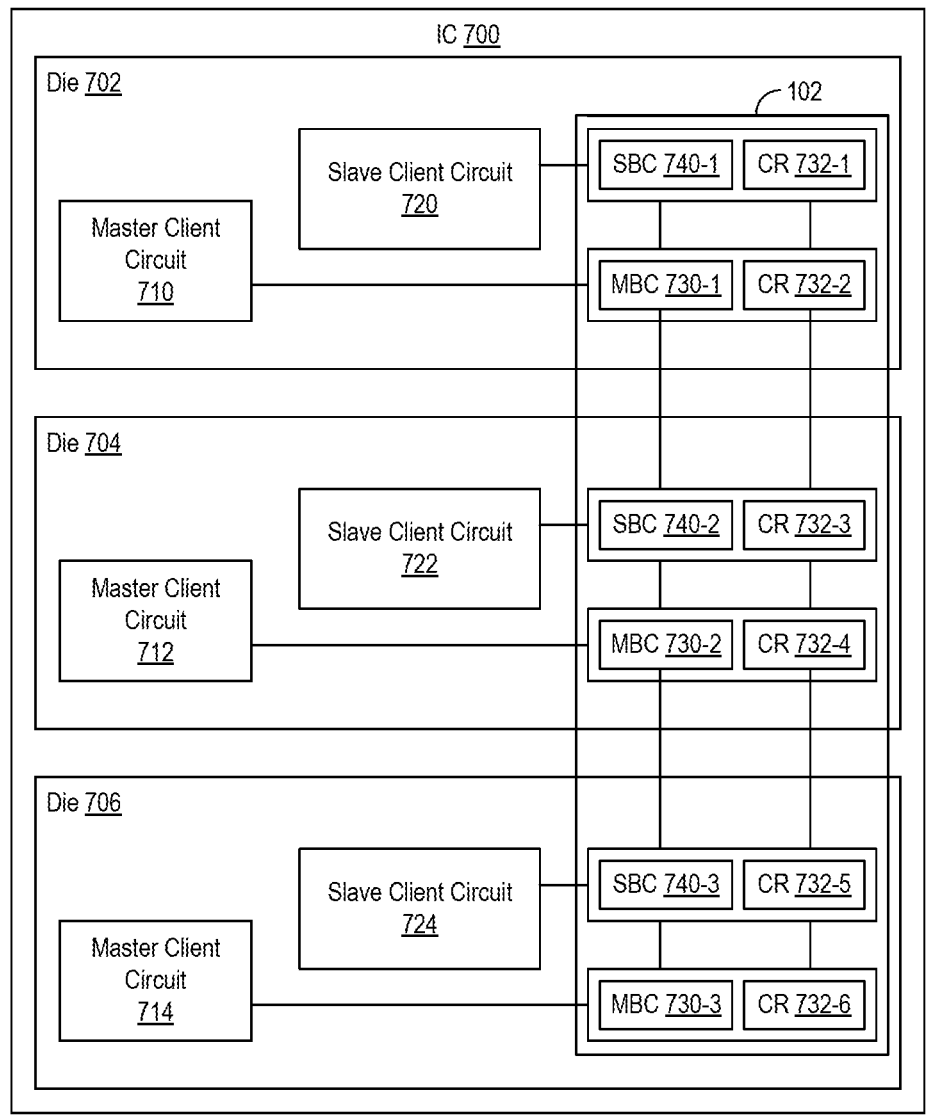
FIG. 7 illustrates another example of an IC having a NoC.

FIG. 7 illustrates another example implementation of NoC 102. In the example of FIG. 7, NoC 102 is implemented in a multi-die IC. In the example, IC 700 includes dies 702, 704, and 706. Dies 702, 704, and 706 may be interconnected using any of a variety of known technologies. As an illustrative and nonlimiting example, dies 702, 704, and 706 may be disposed on an interposer through solder ball connections. The interposer includes wires that connect the different ones of dies 702, 704, and 706 together.

Dies 702, 704, and 706 include master client circuits 710, 712, and 714, respectively and slave client circuits 720, 722, and 724, respectively. Each master client circuit 710 connects to NoC 102 through a different master bridge circuit (MBC) 730. Each slave client circuit 720 connects to NoC 102 though a different slave bridge circuit (SBC) 740. Each master client circuit 710, 712, and 714 and each slave client circuit 720, 722, and 724 further couples to a client router 732 by way of a master bridge circuit 730 in the case of a master client circuit or by way of a slave bridge circuit 740 in the case of a slave client circuit.

For purposes of illustration, an example application of the architecture shown in FIG. 7 may be one where each master client circuit 710, 712, and 714 implements a user specified circuit. Each slave client circuit 720, 722, and 724 may implement a memory controller configured to access off-chip memory. While not illustrated in the example of FIG. 7, one or more delay routers may be inserted between the different client routers 732.

As discussed, while the example NoC implementations described within this disclosure reduce the number of routing resources needed for implementation within any particular die, in the case of a multi-die implementation where NoC 102 spans multiple different dies, the number of inter-die crossings (e.g., wires or connections between dies implemented in the interposer) may be significantly reduced. It should be appreciated that the number of such inter-die crossings may be reduced despite the particular multi-die technology used and how and/or where such inter-die crossings are implemented. For example, inter-die crossings in a substrate or as implemented in a 3D multi-die IC technology may also be reduced.

In addition, the example NoC implementations described within this disclosure provide reduced system latency in a variety of different applications. Latency may be reduced by a factor of 4 in some applications such as neural network implementations where the kernel circuits correspond to master client circuits and the slave client circuits correspond to memory controllers accessing external memory. Other applications where the example NoC implementations described herein may be used include, but are not limited to, database functions where kernel circuits access the database, high performance compute and data analytics including where the dataset size exceeds the capacity of a single RAM (e.g., DDR), image processing pipelines such as those that process feed-forward data streams, and/or multiple hardware accelerator sources where kernel circuits from different vendors may be mixed and used together within a single circuit design.

In accordance with the inventive arrangements described within this disclosure, the schedule implemented by the various bridge circuits described within this disclosure may be generated offline. The schedule, once generated, may be implemented by each of the bridge circuits and followed (e.g., is static). The schedule may be generated using any of a variety of different techniques.

In one example implementation, the schedule may be generated by a scheduler implemented using program code and executed by a computer. In an example implementation, the scheduler may use or include a satisfiability (SAT) solver to determine a schedule for the NoC. In general, a SAT solver is capable of receiving a plurality of user inputs defining a problem to be solved, generating an expression representing the problem, and finding a solution to the expression and, as such, the problem. The expression may be a Boolean formula formed of one or more Boolean variables and Boolean operators. The Boolean formula may be a Conjunctive Normal Form (CNF), which is a Boolean formula formed of a conjunction of clauses.

The SAT solver is capable of solving the expression by finding a variable assignment that satisfies the expression (e.g., where the expression evaluates to "true"). In the case of a Boolean formula, a variable assignment refers to the association of a Boolean value such as "true" or "false" to each of the Boolean variables. Alternatively, the SAT solver is capable of determining that no variable assignment exists that satisfies the expression. The SAT solver utilizes an exhaustive approach to explore the entire search space. Thus, the SAT solver is capable of determining a scheduling solution, e.g., the schedule, for the NoC or determining that a solution does not exist.

For example, the scheduler, using the SAT solver, is capable of automatically finding the scheduling required for correct operation of the NoC using the global arbitration approach described herein. In an example implementation, the scheduler is capable of receiving two user-specified inputs. The inputs include (1) a list of client circuits and their relative placement and (2) a bandwidth matrix indicating the required bandwidth allocation among the different client circuits. In general, the scheduler uses the bandwidth requirement of each client circuit and allocates time slots of an allocation period covered by the schedule. For purposes of illustration, each time slot of the schedule may be a clock cycle. Each client circuit is permitted to send and receive data on the time slots allocated to that client circuit for sending and/or receiving. The allocation period covered by the schedule is the number of time slots that are allocated among the different client circuits. For example, summing the clock cycles allocated to each client circuit of the NoC results in the allocation period.

Figure 8:
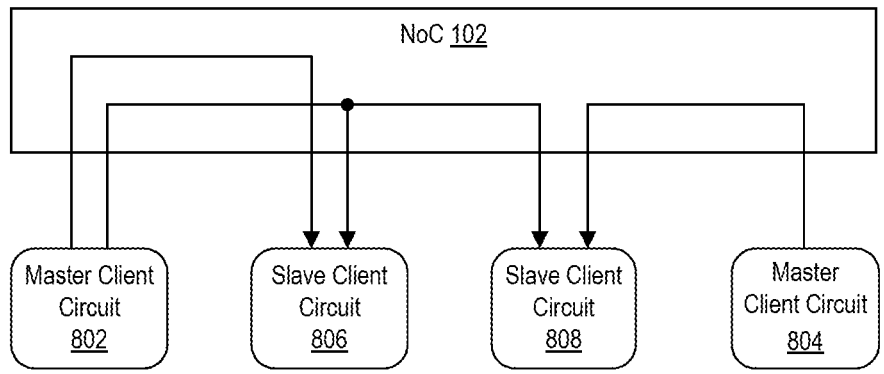
FIG. 8 illustrates an example of a NoC for which a schedule is generated.
Figure 9:
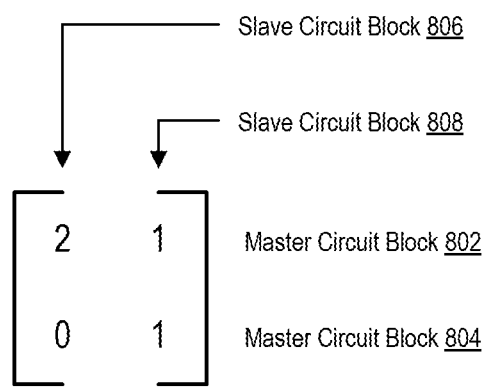
FIG. 9 illustrates an example of a bandwidth matrix.

FIG. 8 illustrates another example implementation of NoC 102 for which a schedule is to be generated. FIG. 9 illustrates an example bandwidth matrix that may be provided by a user as an input to the scheduler for example of FIG. 8. Each entry in the bandwidth matrix represents a bidirectional data throughput requirement.

Referring to FIGS. 8 and 9 in combination, master client circuits 802, 804 and slave client circuits 806, 808 are connected to NoC 102. The topology of the example of FIG. 8 is: {MCC 802; SCC 806; T; T; SCC 808; MCC 804}, where MCC stands for master client circuit, SCC stands for slave client circuit, and "T" represents a delay router. As noted, the number of delay routers may be determined by design based on NoC 102 being able to run at a desired frequency.

Based on the bandwidth matrix of FIG. 9, the scheduler determines that master client circuit 802 uses 2 units of bandwidth to communicate with slave client circuit 806 and 1 unit of bandwidth to communicate with slave client circuit 808. Master client circuit 804 uses 1 unit of bandwidth to communicate with slave client circuit 808 and has no bandwidth allocation to communicate with slave client circuit 806.

The scheduler is capable of determining that the topology of FIG. 8 has a link contention of 2. As defined herein, the term "link contention" means the largest number of master-to-slave connections through a specific router-to-router interface. Since master client circuit 802 has 2 master-to-slave connections while master client circuit 804 has 1, the link contention of the topology of FIG. 8 is 2.

For purposes of illustration, there may be additional MCCs to the left of MCC 802 in FIG. 2 that have connections to the SCCs 806, 808 creating additional contention on all of the links between the additional MCCs and SCCs 806 and 808. If one additional MCC were added to the right of MCC 802 where the additional MCC had 2 units of bandwidth to SCC 808, the total contention would be 4 on the link between MCC 802 and SCC 806.

The scheduler further is capable of determining that the topology of FIG. 8 has a slave port contention of 2. As defined herein, the term "slave port contention" means the largest number of slave-to-master client circuit connections for the topology to be implemented by the NoC. Since slave client circuit 806 has 2 slave-to-master connections to master client circuit 802, while slave client circuit 808 has 1 connection to master client circuit 804, the slave port contention is 2. The slave-to-master connections may be to different master client circuits.

The scheduler is further capable of determining the length of the schedule in terms of time slots (e.g., clock cycles in these examples). In one aspect, the scheduler determines the schedule length based on the link contention and the slave port contention. For example, the scheduler determines an integer value that is greater than or equal to the greater of the link contention and the slave port contention. In the example of FIGS. 8 and 9, the scheduler determines that the schedule length is 2 clock cycles.

The schedule generated by the scheduler defines when each master and slave bridge circuit places data onto NoC 102 and when each master and slave bridge circuit receives data from NoC 102. As noted, however, the schedule is not implemented within the master/slave client circuits themselves, but rather within the master/slave bridge circuits connected to each of the respective client circuits. The schedule guarantees that there are no data collisions or data loss on NoC 102. A data collision refers to the situation where two flits arrive on a router (e.g., client router) at the same time from different ports. Because there is no backpressure, one of the flits would be lost. This condition is avoided through adherence to the schedule.

In determining a solution to the scheduling problem, the SAT solver may observe the rules or assumptions discussed below.

Regarding routing properties, the scheduler presumes the following:

There is one clock cycle (e.g., time slot) delay per client router;

Outputs of each router circuit are registered;

Injection of data into the router network and ejection of data from the router network for master bridge circuits may overlap (e.g., occur on the same clock cycle);

Master bridge circuits perform in-order arbitration;

Injection of data into the router network from slave bridge circuits is exclusive in time;

Ejection of data from the router network to slave bridge circuits is exclusive in time; and Slave bridge circuits are arbitrated by the schedule.

Referring to the foregoing properties and for purposes of illustrating an example schedule implementation, a master client circuit M may have connections with slave client circuits S0 and S1, where the connections are denoted as M→S0 and M→S1. The M→S0 and M→S1 connections may share a time slot of the schedule for injecting flits at the master bridge onto the router network. Selection of data to inject may be in-order arbitration. In the case of master client circuits M0 and M1 having connections to a slave client circuit S, where connections may be represented as M0→S and M1→S, flits from each such connection must arrive at the slave bridge circuit from the router network at exclusive times. Further, flits for S→M0 and S→M1 connections must be injected by the slave bridge circuit onto the router network at exclusive times.

In representing the NoC as a graph for purposes of applying the SAT solver thereto and defining constraints used with the expression, the following rules are observed:

Each node of the graph represents one point in space and time;

Edges of the graph connect nodes that are adjacent in space (e.g., are physically connected) and time (+/−1 time slot or clock cycle);

Nodes have at most 1 fan-in and 2-fan-outs.

Regarding the router network, the data traffic to/from a single master bridge circuit can share nodes and traffic to/from a single slave bridge circuit cannot share nodes;

Regarding client circuits, master bridge circuits are capable of injecting to and/or ejecting from multiple different slave bridge circuits on any given time slot. Slave bridge circuits are only capable of injecting to and/or ejecting from one master bridge circuit per time slot.

For purposes of illustration, the graph may have a fan-in and fan-out of up to 2. It should be appreciated, however, that the technique described herein may be used for other types of networks including 5-Port "Mesh" router networks as well as others that support higher fan-out. The scheduling solution defines may define the set of used edges between nodes while the graph defines the set of total edges available.

In an example implementation, while generating the schedule, the scheduler is capable of building a forward graph and an inverse graph. The scheduler is capable of scheduling the master bridge circuit to slave bridge circuit connections on the forward graph and scheduling the slave bridge circuit to master bridge circuit connections on the inverse graph. The scheduler may then constrain the forward graph and the inverse graph against one another. The injection source nodes of the master bridge may be connected to the spaciotemporal nodes of the corresponding client router in a full crossbar. This facilitates modeling that the master bridge circuit has freedom in selecting the time slots on which the data is injected so that all solutions are explored. The ejection node of the slave bridge circuit is a sink, where the spatiotemporal nodes leading into the sink have exclusivity.

The SAT solver implemented by the scheduler may utilize or enforce several different constraints for purposes of solving the scheduling problem. In one aspect, the SAT solver enforces exclusive use of nodes in the forward and inverse networks. Slave bridge circuit inject and eject time slots may be used only one time. The injection capacity of any master bridge circuit is one per slave bridge circuit per time slot and may be greater than one for multiple slave bridge circuits. The SAT solver further does not permit fan-in on the forward graph or on the inverted graph.

It should be appreciated that using a SAT solver as described herein is provided as one example technique for generating the schedule for the NoC. Other techniques for generating the schedule may be used in lieu of a SAT solver. For example, another algorithm and/or technique for solving a graph may be used. In another example, a heuristic algorithm may be used in place of a SAT solver. The inventive arrangements are not intended to be limited by the particular method or technique of generating the schedule.

Figure 10:
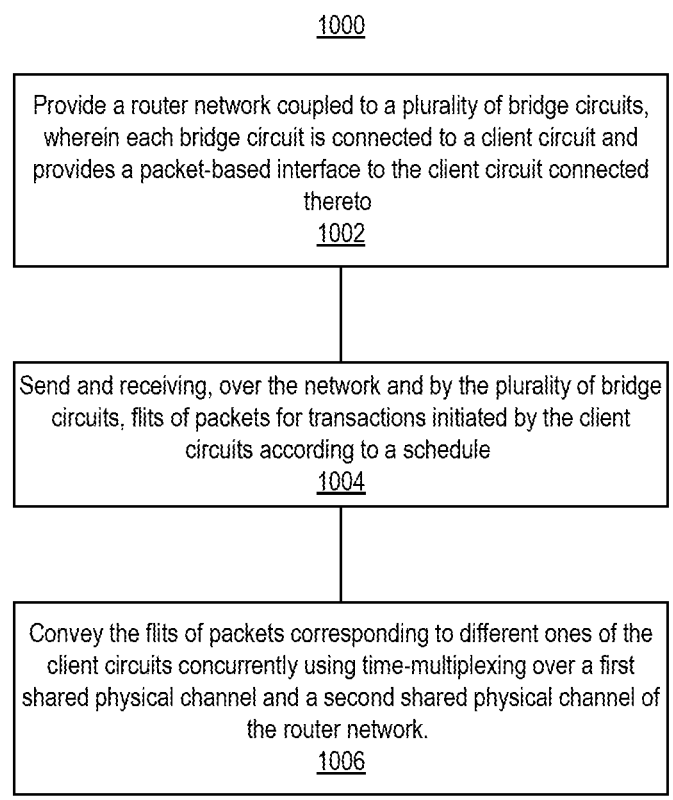
FIG. 10 illustrates an example method of data transfer using a NoC within an IC.

FIG. 10 illustrates an example method 1000 of data transfer using a NoC within an IC. Method 1000 may be performed by a NoC as described within this disclosure in connection with FIGS. 1-7. Method 1000 may begin in a state where a schedule has been generated that is implemented by the respective bridge circuits of the NoC.

In block 1002, a router network is provided. The router network may be implemented within an IC as part of a NoC. The router network may be coupled to a plurality of bridge circuits of the NoC. Each bridge circuit can be connected to a client circuit. Each bridge circuit is capable of providing a packet-based interface to the client circuit connected thereto.

In block 1004, flits of packets are sent and received over the router network via the plurality of bridge circuits. The flits of packets are for transactions initiated by the client circuits. The flits of packets are sent and received over the router network by the plurality of bridge circuits according to the schedule.

In block 1006, the flits of packets corresponding to different ones of the client circuits are conveyed concurrently, using time-multiplexing, over a first shared physical channel and a second shared physical channel of the router network.

Figure 11:
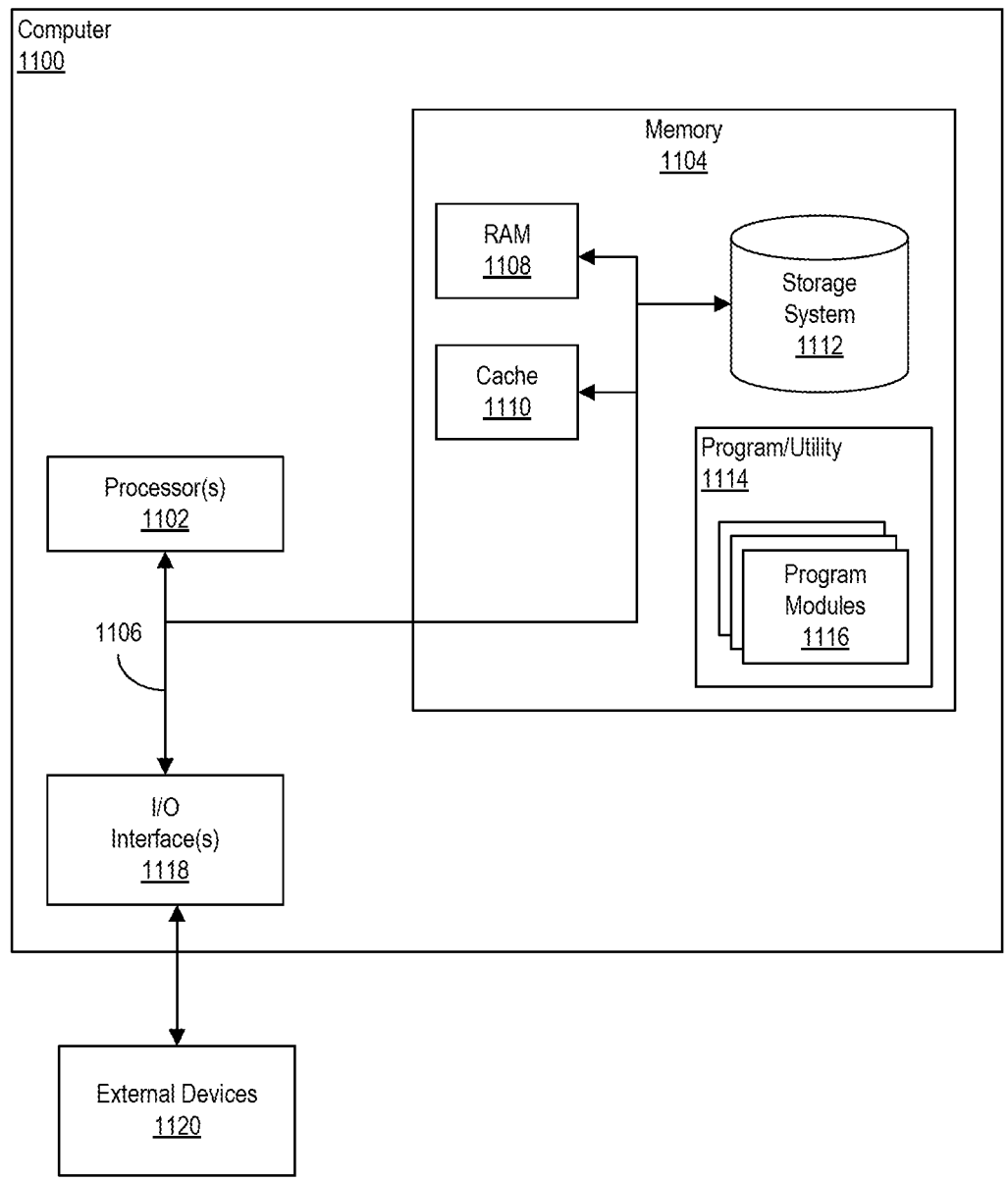
FIG. 11 illustrates an example of a computer for use with the inventive arrangements described within this disclosure.

FIG. 11 illustrates an example of a computer 1100 for use with the inventive arrangements described within this disclosure. In an example implementation, computer 1100 is capable of executing a scheduler as described herein. Computer 1100 can include one or more processors 1102 (e.g., central processing units), a memory 1104, and a bus 1106 that couples various system components including memory 1104 to processor(s) 1102. Processor(s) 1102 may include any of a variety of processors that are capable of executing program code. Example processor types include, but are not limited to, processors having an x86 type of architecture (IA-32, IA-64, etc.), Power Architecture, ARM processors, and the like.

Bus 1106 represents one or more of any of several types of communication bus structures, including a memory bus or memory controller, a peripheral bus, an accelerated graphics port, and a processor or local bus using any of a variety of available bus architectures. By way of example, and not limitation, bus 1106 may be implemented as a Peripheral Component Interconnect Express (PCIe) bus.

Computer 1100 typically includes a variety of computer readable media. Such media may be any available media that is accessible by computer 1100 and may include any combination of volatile media, non-volatile media, removable media, and/or non-removable media.

Memory 1104 may include computer readable media in the form of volatile memory, such as random-access memory (RAM) 1108 and/or cache memory 1110. Computer 1100 may also include other removable/non-removable, volatile/non-volatile computer system storage media. By way of example, storage system 1112 may be provided for reading from and writing to a non-removable, non-volatile magnetic media and/or solid state drive (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 1106 by one or more data media interfaces. As will be further depicted and described below, memory 1104 may include at least one computer program product having a set (e.g., at least one) of program modules (e.g., program code) that are configured to carry out the functions and/or operations described within this disclosure.

For example, program/utility 1114, having a set (at least one) of program modules 1116 which may include, but are not limited to, an operating system, one or more application programs (e.g., user applications), other program modules, and/or program data, is stored in memory 1104. Program modules 1116 generally carry out the functions and/or methodologies as described herein at least with respect to operations performed by computer 1100. For example, program modules 1116 may implement a scheduler capable of performing the operations described herein relating to generating a schedule for a NoC.

Program/utility 1114 is executable by processor(s) 1102. Program/utility 1114 and any data items used, generated, and/or operated upon by processor(s) 1102 are functional data structures that impart functionality when employed by processor(s) 1102. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 1100 may include one or more Input/Output (I/O) interfaces 1118 communicatively linked to bus 1106. In one aspect, I/O interface(s) 1118 may include hardware controllers that allow computer 1100 to communicate with external devices 1120 where external devices 1120 allow a user to interact with computer 1100. For example, in that case, external devices may include a keyboard, a mouse, and/or a display. In other cases, I/O interfaces 128 may include, but are not limited to, network cards, modems, network adapters, etc. that allow computer 1100 to communicate with one or more other systems.

FIG. 11 is not intended to suggest any limitation as to the scope of use or functionality of the examples described herein. Computer 1100 is an example of computer hardware (e.g., a system) that is capable of performing the various operations described within this disclosure. Computer 1100 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service. Other examples of cloud computing models are described in the National Institute of Standards and Technology (NIST) and, more particularly, the Information Technology Laboratory of NIST.

Computer 1100 may be operational with numerous other general-purpose or special-purpose computing system environments or configurations. Examples of computing systems, environments, and/or configurations that may be suitable for use with computer 1100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 12:
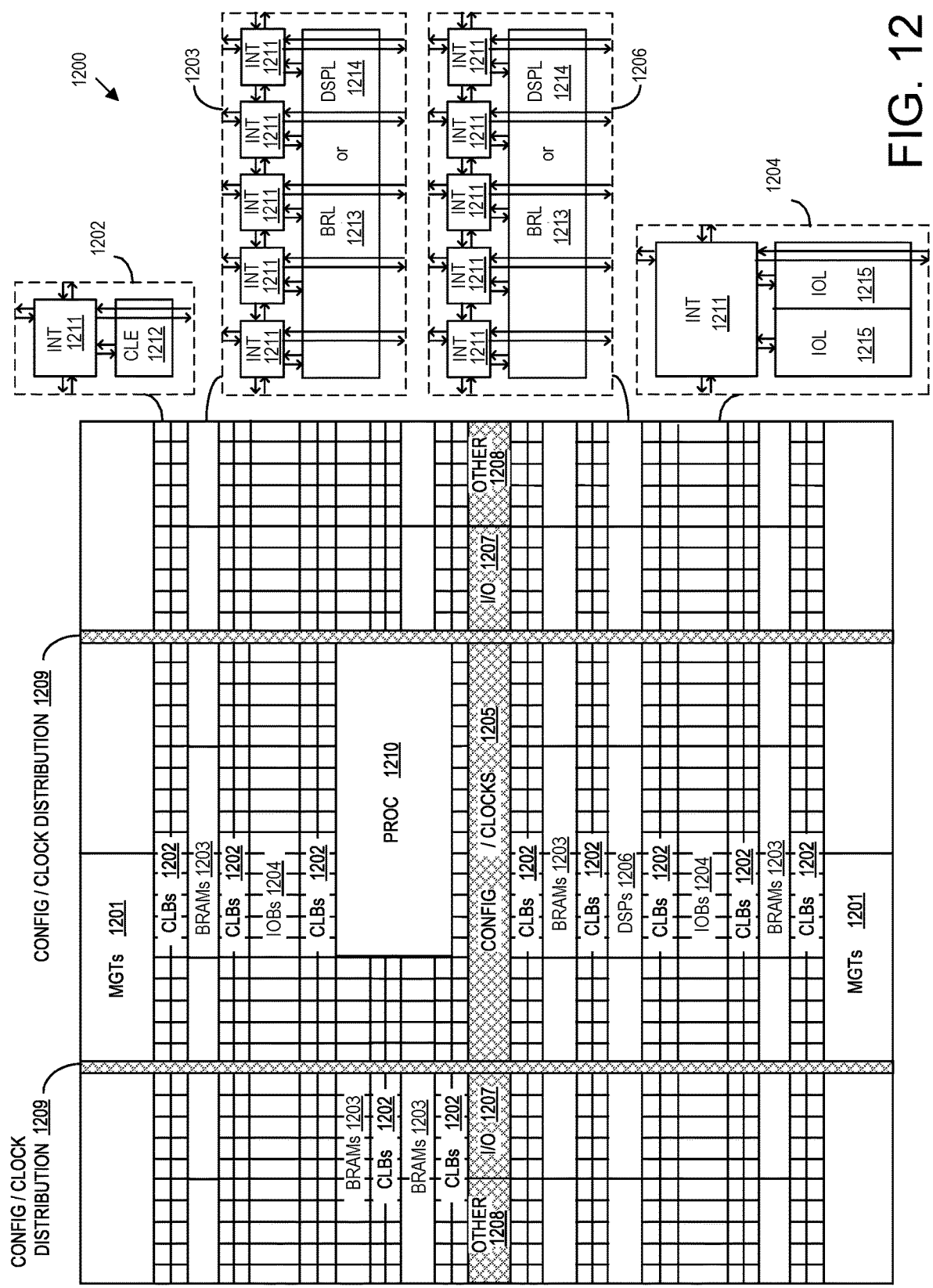
FIG. 12 illustrates an example architecture for an IC.

FIG. 12 illustrates an example architecture 1200 for an IC. In one aspect, architecture 1200 may be implemented within a programmable IC. For example, architecture 1200 may be used to implement a field programmable gate array (FPGA). Architecture 1200 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1200 includes several different types of programmable circuit, e.g., logic, blocks. For example, architecture 1200 may include a large number of different programmable tiles including multi-gigabit transceivers (MGTs) 1201, configurable logic blocks (CLBs) 1202, random access memory blocks (BRAMs) 1203, input/output blocks (IOBs) 1204, configuration and clocking logic (CONFIG/CLOCKS) 1205, digital signal processing blocks (DSPs) 1206, specialized I/O blocks 1207 (e.g., configuration ports and clock ports), and other programmable logic 1208 such as digital clock managers, analog-to-digital converters, system monitoring logic, and so forth.

In some ICs, each programmable tile includes a programmable interconnect element (INT) 1211 having standardized connections to and from a corresponding INT 1211 in each adjacent tile. Therefore, INTs 1211, taken together, implement the programmable interconnect structure for the illustrated IC. Each INT 1211 also includes the connections to and from the programmable logic element within the same tile, as shown by the examples included at the right of FIG. 12.

For example, a CLB 1202 may include a configurable logic element (CLE) 1212 that may be programmed to implement user logic plus a single INT 1211. A BRAM 1203 may include a BRAM logic element (BRL) 1213 in addition to one or more INTs 1211. Typically, the number of INTs 1211 included in a tile depends on the height of the tile. As pictured, a BRAM tile has the same height as five CLBs, but other numbers (e.g., four) also may be used. A DSP tile 1206 may include a DSP logic element (DSPL) 1214 in addition to an appropriate number of INTs 1211. An 10B 1204 may include, for example, two instances of an I/O logic element (IOL) 1215 in addition to one instance of an INT 1211. The actual I/O pads connected to IOL 1215 may not be confined to the area of IOL 1215.

In the example pictured in FIG. 12, a shaded area near the center of the die, e.g., formed of regions 1205, 1207, and 1208, may be used for configuration, clock, and other control logic. Shaded areas 1209 may be used to distribute the clocks and configuration signals across the breadth of the programmable IC.

Some ICs utilizing the architecture illustrated in FIG. 12 include additional logic blocks that disrupt the regular columnar structure making up a large part of the IC. The additional logic blocks may be programmable blocks and/or dedicated circuitry. For example, a processor block depicted as PROC 1210 spans several columns of CLBs and BRAMs.

In one aspect, PROC 1210 may be implemented as dedicated circuitry, e.g., as a hardwired processor, that is fabricated as part of the die that implements the programmable circuitry of the IC. PROC 1210 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1210 may be omitted from architecture 1200 and replaced with one or more of the other varieties of the programmable blocks described. Further, such blocks may be utilized to form a "soft processor" in that the various blocks of programmable circuitry may be used to form a processor that can execute program code as is the case with PROC 1210.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 12 that are external to PROC 1210 such as CLBs 1202 and BRAMs 1203 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1210.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 1210 or a soft processor. In some cases, architecture 1200 includes a dedicated configuration processor that loads the configuration bitstream to the appropriate configuration memory and/or processor memory. The dedicated configuration processor does not execute user-specified program code. In other cases, architecture 1200 may utilize PROC 1210 to receive the configuration bitstream, load the configuration bitstream into appropriate configuration memory, and/or extract program code for execution.

FIG. 12 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 12 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1210 within the IC are for purposes of illustration only and are not intended as limitations.

In one or more example implementations, architecture 1200 may be implemented on a multi-die IC as described in connection with FIG. 7. For example, the circuitry described in connection with FIG. 12 may be implemented across one or more dies of such a multi-die IC. In one aspect, the different dies of the multi-die IC may be the same or similar in architecture. In another aspect, the different dies of the multi-die IC have different architectures where the dies include different hardwired circuit blocks and/or differing programmable circuitry.

The example NoC implementations described within this disclosure may be implemented in programmable logic using an IC having an architecture the same as similar to that of FIG. 12. In other example implementations, the NoC may be implemented using hardwired circuitry and/or a combination of programmable logic and hardwired circuitry.

A system as described herein in connection with FIG. 11, for example, is capable of processing a circuit design for implementation within an IC having an architecture the same as or similar to that of FIG. 12. The system, for example, is capable of synthesizing, placing, and routing the circuit design. The system may also perform bitstream generation so that the bitstream may be loaded into the IC, thereby physically implementing the circuit design within the IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

An IC can include a NoC. The NoC can include a router network having a first shared physical channel and a second shared physical channel. The NoC can include one or more master bridge circuits coupled to the router network, wherein each master bridge circuit provides a packet-based interface to a master client circuit coupled thereto for initiating transactions over the router network. Each master bridge circuit can be configured to send and receive data for the transactions over the router network as flits of packets according to a schedule. The NoC can include one or more slave bridge circuits coupled to the router network, wherein each slave bridge circuit provides a packet-based interface to a slave client circuit coupled thereto to for responding to the transactions over the router network. Each slave bridge circuit can be configured to send and receive the flits of packets for the transactions over the router network according to the schedule. The flits of packets sent from different client circuits are interleaved using time-multiplexing on the first shared physical channel and the second shared physical channel.

The foregoing and other implementations can each optionally include one or more of the following features, alone or in combination. Some example implementations include all the following features in combination.

In another aspect, the one or more master bridge circuits include a plurality of master bridge circuits connected to a plurality of respective master client circuits. The flits of packets correspond to data sent by different master client circuits of the plurality of master circuits.

In another aspect, the one or more slave bridge circuits include a plurality of slave bridge circuits connected to a plurality of respective slave client circuits. The flits of packets correspond to data sent by different slave client circuits of the plurality of slave client circuits.

In another aspect, each of the first shared physical channel and the second shared physical channel is used as a master-to-slave logical channel and a slave-to-master logical channel according to the schedule.

In another aspect, each master bridge circuit is configured to combine data from a write address channel and a write data channel from the master client circuit coupled thereto onto the first shared physical channel or the second shared physical channel.

In another aspect, each master bridge circuit is configured to combine data from a write address channel, a write data channel, and a read address channel from the master client circuit coupled thereto onto the first shared physical channel or the second shared physical channel.

In another aspect, each master bridge circuit is configured to separate data received over the first shared physical channel or the second shared physical channel and send the data to the master client circuit coupled thereto via a write response channel and a read data channel.

In another aspect, each slave bridge circuit combines data from a write response channel and a read data channel from the slave client circuit coupled thereto onto the first shared physical channel or the second shared physical channel.

In another aspect, each slave bridge circuit is configured to separate data received over the first shared physical channel or the second shared physical channel and send the data to the slave client circuit coupled thereto via a write address channel and a write data channel or a read address channel.

In another aspect, wherein the router network includes a client router connected to each of the one or more master bridge circuits and to each of the one or more slave bridge circuits. The client routers are coupled to one another.

In another aspect, one or more pairs of the client routers are directly connected to one another.

In another aspect, one or more pairs of the client routers are coupled by one or more intervening delay routers.

In another aspect, the first shared physical channel has a bit width that is less than or equal to a widest of a write data channel and a read data channel.

In another aspect, the second shared physical channel has a bit width that is less than or equal to a widest of a write data channel and a read data channel.

In another aspect, the IC includes a plurality of inter-connected dies, wherein the router network spans the plurality of inter-connected dies.

A method of within an IC can include providing a router network coupled to a plurality of bridge circuits, wherein each bridge circuit is connected to a client circuit. Each bridge circuit can provide a packet-based interface to the client circuit connected thereto. The method can include sending and receiving, over the router network and by the plurality of bridge circuits, flits of packets for transactions initiated by the client circuits. The plurality of bridge circuits perform the sending and receiving according to a schedule. The method also can include conveying, over a first shared physical channel and a second shared physical channel of the router network, the flits of packets corresponding to different ones of the client circuits concurrently using time-multiplexing.

The foregoing and other implementations can each optionally include one or more of the following features, alone or in combination. Some example implementations include all the following features in combination.

In another aspect, each of the first shared physical channel and the second shared physical channel is used as a master-to-slave logical channel and a slave-to-master logical channel according to the schedule.

In another aspect, the router network includes one client router connected to each bridge circuit, wherein the client routers are coupled to one another.

In another aspect, one or more of the plurality of bridge circuits is a master bridge circuit and each master bridge circuit is configured to combine data from a write address channel, a write data channel, and/or a read address channel from a master client circuit coupled thereto onto the first shared physical channel or the second shared physical channel.

In another aspect, one or more of the plurality of bridge circuits is a slave bridge circuit and each slave bridge circuit combines data from a write response channel and a read data channel onto the first shared physical channel or the second shared physical channel.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. An integrated circuit having a Network-on-Chip, the Network-on-Chip comprising:
   a router network having a first shared physical channel and a second shared physical channel;
   one or more master bridge circuits coupled to the router network, wherein each master bridge circuit provides a packet-based interface to a master client circuit coupled thereto for initiating transactions over the router network, wherein each master bridge circuit includes a schedule controller configured to send and receive data for the transactions over the router network as flits of packets according, at least in part, to destination bridge circuits for the flits of data and a static schedule for sending the data; and one or more slave bridge circuits coupled to the router network, wherein each slave bridge circuit provides a packet-based interface to a slave client circuit coupled thereto to for responding to the transactions over the router network, wherein each slave bridge circuit includes a schedule controller configured to send and receive, over the router network, the flits of packets for the transactions according to the static schedule;

wherein the flits of packets sent from different client circuits are interleaved using time-multiplexing on the first shared physical channel and the second shared physical channel and conveyed, based on the static schedule, without deflection.

2. The integrated circuit of claim 1, wherein:

the one or more master bridge circuits include a plurality of master bridge circuits connected to a plurality of respective master client circuits; and the flits of packets correspond to data sent by different master client circuits of the plurality of master circuits.

3. The integrated circuit of claim 1, wherein:

the one or more slave bridge circuits include a plurality of slave bridge circuits connected to a plurality of respective slave client circuits; and the flits of packets correspond to data sent by different slave client circuits of the plurality of slave client circuits.

4. The integrated circuit of claim 1, wherein each of the first shared physical channel and the second shared physical channel is used as a master-to-slave logical channel and a slave-to-master logical channel according to the schedule.

5. The integrated circuit of claim 1, wherein:

each master bridge circuit is configured to combine data from a write address channel and a write data channel from the master client circuit coupled thereto onto the first shared physical channel or the second shared physical channel.

6. The integrated circuit of claim 1, wherein:

each master bridge circuit is configured to combine data from a write address channel, a write data channel, and a read address channel from the master client circuit coupled thereto onto the first shared physical channel or the second shared physical channel.

7. The integrated circuit of claim 1, wherein:

each master bridge circuit is configured to separate data received over the first shared physical channel or the second shared physical channel and send the data to the master client circuit coupled thereto via a write response channel and a read data channel.

8. The integrated circuit of claim 1, wherein:

each slave bridge circuit combines data from a write response channel and a read data channel from the slave client circuit coupled thereto onto the first shared physical channel or the second shared physical channel.

9. The integrated circuit of claim 1, wherein:

each slave bridge circuit is configured to separate data received over the first shared physical channel or the second shared physical channel and send the data to the slave client circuit coupled thereto via a write address channel and a write data channel or a read address channel.

10. The integrated circuit of claim 1, wherein the router network comprises:

a client router connected to each of the one or more master bridge circuits and to each of the one or more slave bridge circuits; and wherein the client routers are coupled to one another.

11. The integrated circuit of claim 10, wherein:

one or more pairs of the client routers are directly connected to one another.

12. The integrated circuit of claim 10, wherein:

one or more pairs of the client routers are coupled by one or more intervening delay routers.

13. The integrated circuit of claim 1, wherein:

the first shared physical channel has a bit width that is less than or equal to a widest of a write data channel and a read data channel.

14. The integrated circuit of claim 1, wherein:

the second shared physical channel has a bit width that is less than or equal to a widest of a write data channel and a read data channel.

15. The integrated circuit of claim 1, further comprising:

a plurality of inter-connected dies, wherein the router network spans the plurality of inter-connected dies.

16. A method of data transfer within an integrated circuit, the method comprising:

providing a router network coupled to a plurality of bridge circuits, wherein each bridge circuit is connected to a client circuit;

wherein each bridge circuit provides a packet-based interface to the client circuit connected thereto;

sending and receiving, over the router network and by the plurality of bridge circuits, flits of packets for transactions initiated by the client circuits, wherein the plurality of bridge circuits include schedule controllers that perform the sending and receiving according to destination bridge circuits for the flits of packets and a static schedule; and conveying, over a first shared physical channel and a second shared physical channel of the router network, the flits of packets corresponding to different ones of the client circuits concurrently using time-multiplexing based on the static schedule without deflection.

17. The method of claim 16, wherein:

each of the first shared physical channel and the second shared physical channel is used as a master-to-slave logical channel and a slave-to-master logical channel according to the schedule.

18. The method of claim 16, wherein:

the router network includes one client router connected to each bridge circuit, wherein the client routers are coupled to one another.

19. The method of claim 16, wherein:

one or more of the plurality of bridge circuits is a master bridge circuit; and each master bridge circuit is configured to combine data from a write address channel and a write data channel from a master client circuit coupled thereto onto the first shared physical channel or the second shared physical channel.

20. The method of claim 16, wherein:

one or more of the plurality of bridge circuits is a slave bridge circuit; and each slave bridge circuit combines data from a write response channel and a read data channel onto the first shared physical channel or the second shared physical channel.

* * * * *